A. H. YOUNG.
RESILIENT TUBELESS TIRE.
APPLICATION FILED JUNE 21, 1920.

1,373,111. Patented Mar. 29, 1921.

WITNESSES

INVENTOR
A. H. Young,
BY
ATTORNEYS

UNITED STATES PATENT OFFICE.

AMI HAYWARD YOUNG, OF OAKLAND, CALIFORNIA.

RESILIENT TUBELESS TIRE.

1,373,111.  Specification of Letters Patent.  Patented Mar. 29, 1921.

Application filed June 21, 1920. Serial No. 390,554.

*To all whom it may concern:*

Be it known that I, AMI HAYWARD YOUNG, a citizen of the United States, and a resident of Oakland, in the county of Alameda and State of California, have invented certain new and useful Improvements in Resilient Tubeless Tires, of which the following is a specification.

My present invention relates generally to pneumatic tires, and more particularly to a resilient tubeless tire, my object being the provision of a tire construction which will avoid the usual disadvantages with respect to blow-outs, punctures and the like requiring replacement and repair of an inner tube when it is once perforated.

My invention also has for its object the provision of a non-deflatable tire adapted alike to the wheels of different vehicles employing pneumatic tires at the present time as well as one which will avoid the necessity of frequent pumping and may in the first instance be provided with a required internal pressure to sustain a prescribed load.

Figure 1:
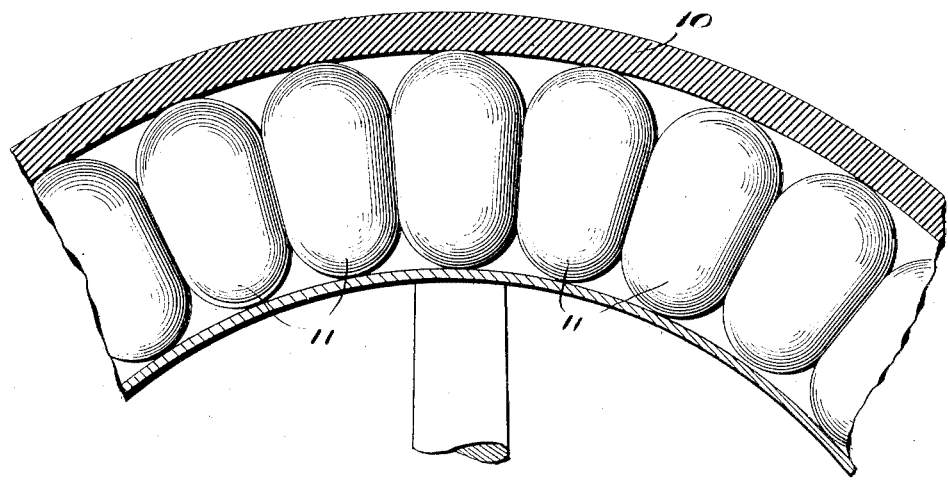
Figure 2:
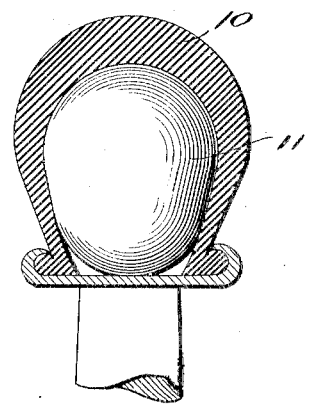
Figure 3:
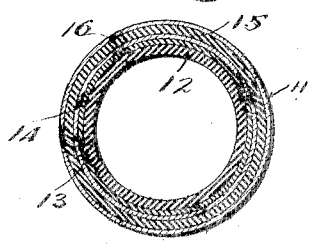

In the accompanying drawing illustrating my present invention and forming a part of this specification, Figure 1 is a partial longitudinal section through a tire constructed in accordance with my invention, Fig. 2 is a radial section, and Fig. 3 is a section taken diametrically through one of the air containers removed.

Referring now to these figures my invention proposes a tubeless resilient tire comprising an outer shoe or casing 10 which may be made in either the clencher or straight side styles now in use and which may be formed in various ways as to its laminæ or internal structure for wear resisting as well as the resisting of stone bruising and penetration by sharp objects.

Within this casing, and in lieu of the usual inner tube having a continuous circumferential air space, I utilize a plurality of reinforced resilient deformable air containers 11, each of which is originally of the globular form shown in Fig. 3 and preferably made up of an inner hollow sphere 12 of rubber which, after being supplied with a certain air pressure, is hermetically sealed and incased by a second rubber layer 13. On the layer 13 is an inner fabric envelop 14 incased by rubber 15 to the latter of which an outer fabric envelop 16 is applied, the whole being then vulcanized so that a sustaining wall is provided for each air container, in itself of resilient qualities and higher resisting strength as against pressure and puncturing.

The air containers 11 are in the first instance placed in a circumferential series in and around the casing 10 and then compressed in the series by circumferential pressure and the insertion of additional spheres until the required internal pressure is reached and the spheres deformed to substantially the egg shape shown in Fig. 1, with their larger ends in contact with the inner surface of the tread portion of the casing 10.

Thus in the ultimate position of the parts, each of the resilient air containers acts substantially as a key stone exerting its pressure outwardly against the periphery of the casing, and while this pressure is individual to a certain extent, the embodiment of the containers in a series admits of the rupture of one or more without materially effecting the sustaining function of the several remaining containers of the series, or of the series as a whole and the pressure also serves to displace the balls of the series in order to take up the space of collapsed balls.

It is thus obvious that having been once embodied in the relation stated within the casing 10, the several air containers and the casing form a tire whose internal pressure may be calculated to a nicety for a required or prescribed load support, avoiding the well known disadvantages of under inflation or over inflation of the present pneumatic tires in unskilled hands. It is equally obvious my invention provides a tire which when once formed, remains throughout its life without the necessity of reinflation and which will avoid collapse in case of puncture and consequently the disadvantages of rim cuts and bruising, subject of course to replacement of one or more of the air containers from time to time.

I claim:

An air container for pneumatic tire casings of globular form and consisting of an inner hollow rubber sphere hermetically sealed to permanently retain internal air pressure, a layer of rubber around the sphere, and inner and outer fabric layers with a layer of rubber interposed between the fabric layers, the whole being vulcanized as and for the purpose set forth.

AMI HAYWARD YOUNG.